(12) United States Patent
Liao et al.

(10) Patent No.: US 8,883,956 B2
(45) Date of Patent: Nov. 11, 2014

(54) POLYIMIDES

(71) Applicant: Industrial Technology Research Institute, Hsinchu (TW)

(72) Inventors: Hsueh-Yi Liao, Yonghe (TW); Chyi-Ming Leu, Hsinchu County (TW); Tzong-Ming Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/662,203

(22) Filed: Oct. 26, 2012

(65) Prior Publication Data

US 2013/0172513 A1 Jul. 4, 2013

(30) Foreign Application Priority Data

Dec. 30, 2011 (TW) .............................. 100149775 A

(51) Int. Cl.
*C08G 69/26* (2006.01)

(52) U.S. Cl.
USPC .......................................................... 528/340

(58) Field of Classification Search
USPC ................................................ 528/229, 340
See application file for complete search history.

(56) References Cited

U.S. PATENT DOCUMENTS

| | | | | |
|---|---|---|---|---|
| 3,666,709 A | * | 5/1972 | Suzuki et al. ................. | 524/323 |
| 4,299,750 A | * | 11/1981 | Antonoplos et al. ......... | 524/602 |
| 4,378,324 A | * | 3/1983 | Makino et al. ................. | 264/41 |
| 4,512,893 A | * | 4/1985 | Makino et al. ........... | 210/500.28 |
| 5,066,760 A | * | 11/1991 | Seidl et al. ...................... | 528/51 |
| 5,112,942 A | * | 5/1992 | Blocker ....................... | 528/353 |
| 5,145,937 A | * | 9/1992 | Hergenrother et al. ....... | 528/125 |
| 5,175,241 A | * | 12/1992 | Darrow ........................ | 528/353 |
| 5,196,500 A | * | 3/1993 | Kreuz et al. .................. | 528/125 |
| 5,212,276 A | | 5/1993 | Hergenrother et al. | |
| 5,264,545 A | * | 11/1993 | Blum et al. ................... | 528/353 |
| 5,288,697 A | * | 2/1994 | Schrepp et al. ............... | 505/470 |
| 5,395,918 A | * | 3/1995 | Harris et al. ................. | 528/353 |
| 5,446,074 A | * | 8/1995 | Czornyj et al. ............... | 522/164 |
| 5,449,742 A | | 9/1995 | Beuhler et al. | |
| 5,453,484 A | * | 9/1995 | Rhee et al. ................... | 528/353 |
| 5,502,157 A | * | 3/1996 | Chang et al. ................. | 528/353 |
| 5,508,357 A | * | 4/1996 | Matsuura et al. ............. | 525/420 |
| 5,543,493 A | | 8/1996 | Park et al. | |
| 5,644,022 A | * | 7/1997 | Jensen ......................... | 528/353 |
| 6,054,554 A | | 4/2000 | Choi et al. | |
| 6,274,699 B1 | * | 8/2001 | Meador ........................ | 528/353 |
| 6,600,006 B2 | * | 7/2003 | Jung et al. .................... | 528/353 |
| 6,680,363 B2 | * | 1/2004 | Hosokawa et al. ........... | 528/170 |
| 6,710,160 B2 | | 3/2004 | Yamashita et al. | |
| 6,770,733 B2 | * | 8/2004 | Zuo et al. ..................... | 528/353 |
| 6,777,525 B2 | * | 8/2004 | Pater ............................ | 528/170 |
| 7,019,104 B1 | | 3/2006 | Okada et al. | |
| 7,901,745 B2 | | 3/2011 | Oh et al. | |
| 7,994,274 B2 | * | 8/2011 | Deets et al. .................. | 528/353 |

| | | | | |
|---|---|---|---|---|
| 2003/0073803 A1 | | 4/2003 | Pater | |
| 2006/0060956 A1 | | 3/2006 | Tanikella | |
| 2007/0065603 A1 | * | 3/2007 | Leu et al. ..................... | 428/1.26 |
| 2009/0299014 A1 | | 12/2009 | Oh et al. | |
| 2010/0060834 A1 | * | 3/2010 | Fang et al. ................... | 349/123 |
| 2010/0151155 A1 | | 6/2010 | Kwak et al. | |
| 2010/0188628 A1 | | 7/2010 | Kwak et al. | |
| 2010/0279131 A1 | | 11/2010 | Park et al. | |
| 2011/0155235 A1 | * | 6/2011 | Tseng et al. .................. | 136/256 |
| 2012/0037405 A1 | * | 2/2012 | Hamazawa et al. ........... | 174/254 |
| 2012/0160317 A1 | * | 6/2012 | Leu et al. ...................... | 136/256 |

FOREIGN PATENT DOCUMENTS

| | | |
|---|---|---|
| CN | 101157077 A | 4/2008 |
| CN | 101921403 A | 12/2010 |
| DE | 4436358 A1 | 5/1995 |
| JP | 2010-189631 A | 9/2010 |
| TW | 200745796 | 12/2007 |
| TW | 200900389 | 1/2009 |
| TW | 200927800 | 7/2009 |

OTHER PUBLICATIONS

Yin et al. (Polymer Materials Science and Engineering vol. 14(4), 1998, 50-52 and 55).*

(Continued)

*Primary Examiner* — Liam J Heincer
(74) *Attorney, Agent, or Firm* — Birch, Stewart, Kolasch & Birch, LLP

(57) ABSTRACT

Disclosed is a polyimide polymerized by x molar parts of a first diamine, y molar parts of a second diamine, and 100 molar parts of a first dianhydride, wherein the first diamine has a formula of

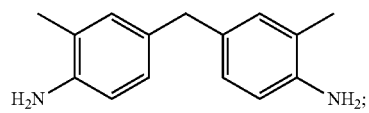

the second diamine has a formula of

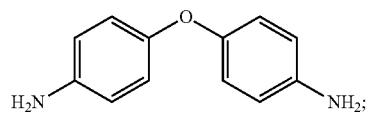

the first dianhydride has a formula of

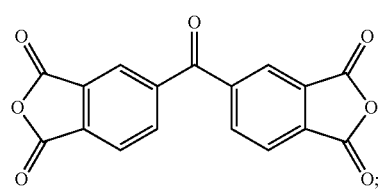

$a+b=100$, $50 \leq x \leq 80$, and $20 \leq y \leq 50$.

8 Claims, No Drawings

(56) References Cited

OTHER PUBLICATIONS

Translation of Yin et al. (Polymer Materials Science and Engineering vol. 14(4), 1998, 50-52 and 55), 2013.*

Jin-gang Liu et al., "Synthesis and Characterization of Highly organo-Soluble Polyimides Based on Alicyclic 1,8-Dimethyl-Bicyclo [2.2.2]Oct-7-Ene-2,3,5,6-Tetracarboxylic Dianhydride and Aromatic Diamines", Chinese Journal of Polymer Science vol. 22, No. 6, (2004), pp. 511-519.

M. Ree et al., "Residual Stress Behavior in Spion-cast Films of Soluble Polyimides", Korea Polymer Journal, vol. 7, No. 6, (1999), pp. 370-376.

* cited by examiner

POLYIMIDES

CROSS REFERENCE TO RELATED APPLICATIONS

The present application is based on, and claims priority from, Taiwan Application Serial Number 100149775, filed on Dec. 30, 2011, the disclosure of which is hereby incorporated by reference herein in its entirety.

TECHNICAL FIELD

The technical field relates to polyimides, and in particular relates to monomers with a specific ratio to be polymerized to form the polyimides.

BACKGROUND

Polyimides, having excellent thermal, mechanical, and electrical properties, belong to thermal resist materials with applications in several fields. Aromatic monomers are adopted to form polyimides with excellent thermal resistance. However, most of the aromatic polyimides have a low solubility in solvents, or an unstable viscosity and are difficult to store.

Accordingly, a novel polyimide composition with a high solubility and a good storage property is called for.

SUMMARY

One embodiment of the disclosure provides a polyimide, being polymerized by x molar parts of a first diamine, y molar parts of a second diamine, and 100 molar parts of a first dianhydride, wherein the first diamine has a formula of

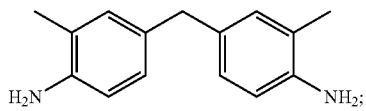

the second diamine has a formula of

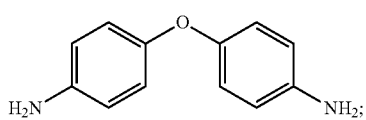

the first dianhydride has a formula of

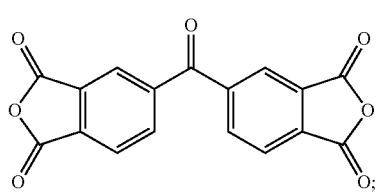

$x+y=100$; $50 \leq x \leq 80$; and $20 \leq y \leq 50$.

One embodiment of the disclosure provides a polyimide, being polymerized by x molar parts of a first diamine, y molar parts of a second diamine, z molar parts of a first dianhydride, and w molar parts of a second dianhydride; wherein the first diamine has a formula of

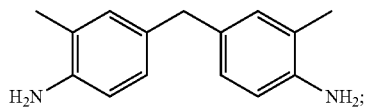 [SMILES: Cc1cc(Cc2ccc(N)c(C)c2)ccc1N]

the second diamine has a formula of

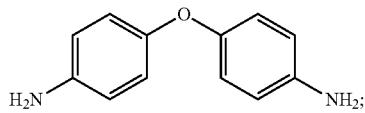 [SMILES: Nc1ccc(Oc2ccc(N)cc2)cc1]

the first dianhydride has a formula of

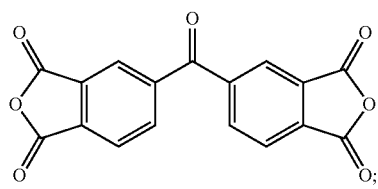 [SMILES: O=C(c1ccc2c(c1)C(=O)OC2=O)c1ccc2c(c1)C(=O)OC2=O]

the second dianhydride has a formula of

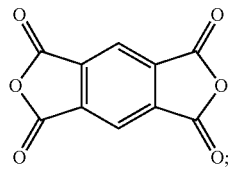 [SMILES: O=c1oc(=O)c2cc3c(=O)oc(=O)c3cc12]

$x+y=z+w=100$; $50 \leq x \leq 80$; $20 \leq y \leq 50$; $60 \leq z < 100$; and $0 < w \leq 40$.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polyimide, which is polymerized by x molar parts of a first diamine, y molar parts of a second diamine, and 100 molar parts of a first dianhydride. $x+y=100$, $50 \leq x \leq 80$, and $20 \leq y \leq 50$. An overly high amount of the first diamine will make the polyimide being precipitated (insoluble) from the polymerization reaction. The first diamine has a chemical structure as shown in Formula 1, the second diamine has a chemical structure as shown in Formula 2, and the first dianhydride has a chemical structure as shown in Formula 3, respectively.

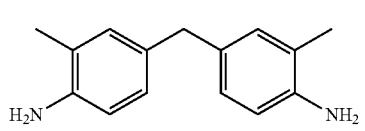

(Formula 1)

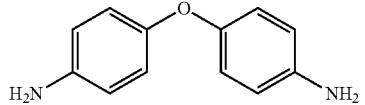

(Formula 2)

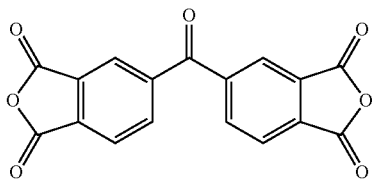

(Formula 3)

The diamines and the dianhydride are polymerized to form the polyimide as shown in Formula 4. The molecular weight of the polyimide corresponds to its relative viscosity. A higher relative viscosity of the polyimide means that the polyimide has a higher molecular weight, and vice versa. For example, the polyimide in Formula 4 has a relative viscosity of about 1000 cps to 5000 cps at 25° C. The prepared polyimide can be dissolved in a common solvent such as toluene, m-cresol, N-methyl-2-pyrrolidone (NMP), or combinations thereof. The polyimide solution is coated on a substrate, and then baked at about 50° C. to 200° C. for about 150 minutes to 200 minutes to remove the solvent thereof, thereby forming a polyimide film.

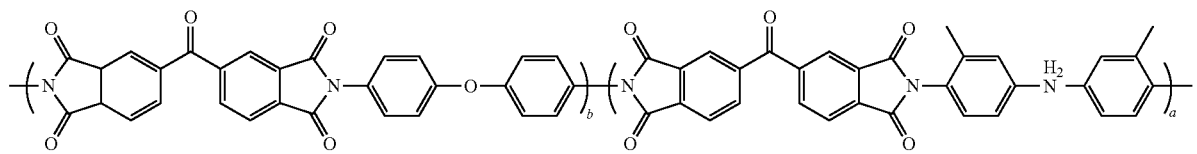

(Formula 4)

The repeating unit corresponding to the repeating number b and the repeating unit corresponding to the repeating number a are copolymerized to form a random copolymer or a block copolymer. In other words, the polyimide in Formula 4 can be a random copolymer or a block copolymer.

One embodiment of the disclosure provides a polyimide, which is polymerized by x molar parts of the first diamine, y molar parts of the second diamine, z molar parts of the first dianhydride, and w molar parts of a second dianhydride. $x+y=z+w=100$, $50 \leq x \leq 80$, $20 \leq y \leq 50$, $60 \leq z < 100$, and $0 < w \leq 40$. The first diamine has a chemical structure as shown in Formula 1, the second diamine has a chemical structure as shown in Formula 2, the first dianhydride has a chemical structure as shown in Formula 3, and the second dianhydride has a chemical structure as shown in Formula 5, respectively.

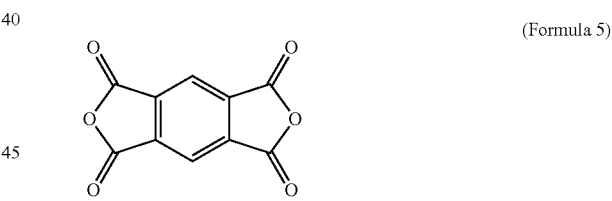

(Formula 5)

The diamines and the dianhydrides are copolymerized to from a polyimide as shown in Formula 6, wherein $a1+a2=x$, $b1+b2=y$, $a1+b1=z$, and $a2+b2=w$. The repeating units corresponding to the repeating numbers a1, a2, b1, and b2 are copolymerized to form a random copolymer or a block copolymer. In other words, the polyimide in Formula 6 can be a random copolymer or a block copolymer.

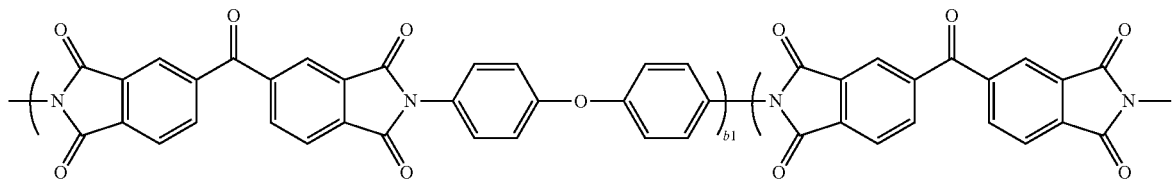

(Formula 6)

-continued

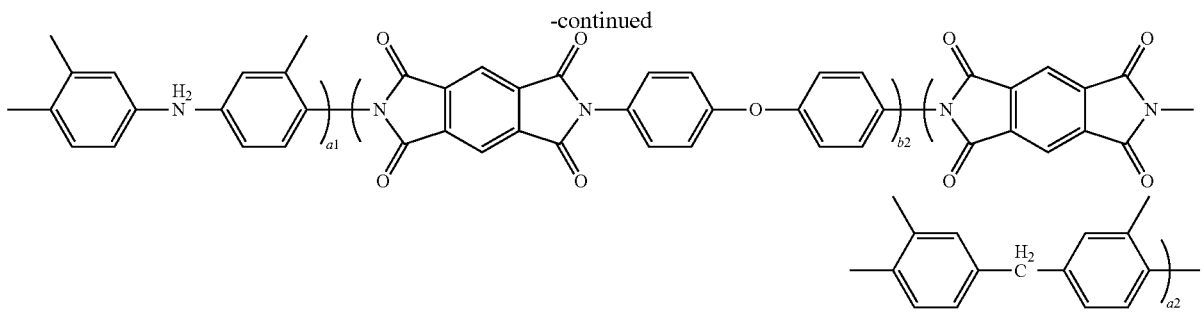

The molecular weight of the polyimide corresponds to its relative viscosity. A higher relative viscosity of the polyimide means that the polyimide has a higher molecular weight, and vice versa. For example, the polyimide in Formula 6 has a relative viscosity of about 2000 cps to 30000 cps at 25° C. The prepared polyimide can be dissolved in a common solvent such as toluene, m-cresol, N-methyl-2-pyrrolidone (NMP), or combinations thereof.

In one embodiment, the polyimide can be stored at room temperature (e.g. about 20° C. to 30° C. or about 25° C.) for about 1 day to 180 days without largely changing the relative viscosity of the polyimide. The relative viscosity variation of the polyimide (after being stored for a long period) is less than or equal to about 10%, or less than or equal to about 5%. In some embodiments, the relative viscosity variation of the polyimide (after being stored for a long period) is less than about 1%.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

Example 1

50 molar parts of the diamine in Formula 2 (37.47 g) and 50 molar parts of the diamine in Formula 1 (63.53 g) were dissolved in 913.65 mL of m-cresol. 60 molar parts of the dianhydride in Formula 3 (88.64 g) and 40 molar parts of the dianhydride in Formula 5 (40.0 g) were then added to the m-cresol solution. 0.23 g of iso-quinoline to serve as a catalyst was then added to the m-cresol solution. The m-cresol solution was first stirred at room temperature for 5 minutes, and then heated to 220° C. and then reacted at 220° C. for 4 hours to obtain a polyimide. The polyimide solution was then cooled to room temperature, and 127.57 g of toluene and 255.15 g of m-cresol served as diluents was then added to the cooled polyimide solution. The diluted polyimide solution had a solid content of 15% and a relative viscosity of 9125 cps at 25° C. The diluted polyimide solution was stored at room temperature (about 20° C. to 30° C.) to measure its relative viscosity variation. As shown in Table 1, the relative viscosity of the polyimide solution would not change very much after the polyimide solution had been stored for a long period.

TABLE 1

| Storing period (days) | 1 | 5 | 10 | 20 | 30 | 60 | 120 |
|---|---|---|---|---|---|---|---|
| Relative viscosity (cps) | 9125 | 9200 | 9215 | 9180 | 9130 | 9120 | 9165 |

The soluble polyimide had a Tg of 310° C. and a Td of 498.53° C. The polyimide solution could be coated and then baked at a temperature of 50° C. gradually raised to 200° C. for total of 180 minutes to remove the solvent from the coating, thereby completing a polyimide film with a breakdown voltage of 5.2 kV.

Example 2

40 molar parts of the diamine in Formula 2 (35.99 g) and 60 molar parts of the diamine in Formula 1 (61.01 g) were dissolved in 913.65 mL of m-cresol. 60 molar parts of the dianhydride in Formula 3 (88.64 g) and 40 molar parts of the dianhydride in Formula 5 (40.0 g) were then added to the m-cresol solution. 0.23 g of iso-quinoline to serve as a catalyst was then added to the m-cresol solution. The m-cresol solution was first stirred at room temperature for 5 minutes, and then heated to 220° C. and then reacted at 220° C. for 4 hours to obtain a polyimide. The polyimide solution was then cooled to room temperature, and 91.47 g of toluene and 284.58 g of m-cresol serving as diluents was then added to the polyimide solution. The diluted polyimide solution had a solid content of 15% and a relative viscosity of 15600 cps at 25° C. The soluble polyimide had a Tg of 300° C. and a Td of 498.53° C. The polyimide solution could be coated and then baked at a temperature of 50° C. gradually raised to 200° C. for total of 180 minutes to remove the solvent from the coating, thereby completing a polyimide film with a breakdown voltage of 5.2 kV.

Example 3

20 molar parts of the diamine in Formula 2 (17.99 g) and 80 molar parts of the diamine in Formula 1 (81.35 g) were dissolved in 563.77 mL of NMP. 80 molar parts of the dianhydride in Formula 3 (118.18 g) and 20 molar parts of the dianhydride in Formula 5 (20.0 g) were then added to the NMP solution. 4.75 g of iso-quinoline to serve as a catalyst was then added to the NMP solution. The NMP solution was firstly stirred at room temperature for 5 minutes, and then heated to 220° C. and then reacted at 220° C. for 4 hours to obtain a polyimide. The polyimide solution was then cooled to room temperature, and 395.87 g of NMP to serve as a diluent was then added to the polyimide solution. The diluted polyimide solution had a solid content of 30%. The diluted polyimide with a solid content of 15% has a relative viscosity of 2760 cps at 25° C. The soluble polyimide had a Tg of 320° C. and a Td of 506.08° C.

Example 4

20 molar parts of the diamine in Formula 2 (6.09 g) and 80 molar parts of the diamine in Formula 1 (27.53 g) were dissolved in 192.12 mL of NMP. 100 molar parts of the dianhydride in Formula 3 (50 g) was then added to the NMP solution. 4.75 g of isoquinoline to serve as a catalyst was then added to the NMP solution. The NMP solution was first stirred at room temperature for 5 minutes, and then heated to 220° C. and then reacted at 220° C. for 4 hours to obtain a polyimide. The polyimide solution was then cooled to room temperature, and 134.5 g of NMP to serve as a diluent was then added to the polyimide solution. The diluted polyimide solution had a solid content of 30%. The diluted polyimide with a solid content of 15% has a relative viscosity of 1500 cps at 25° C. The polyimide solution has sufficient flowability to be beneficial in forming a film. The polyimide solution was stored at room temperature (about 20° C. to 30° C.) to measure its relative viscosity variation. As shown in Table 2, the relative viscosity of the polyimide solution would not change very much after the polyimide solution had been stored for a long period.

TABLE 2

| Storing period (days) | 1 | 5 | 10 | 20 | 30 | 60 | 120 |
|---|---|---|---|---|---|---|---|
| Relative viscosity (cps) | 1500 | 1550 | 1530 | 1480 | 1560 | 1580 | 1510 |

Comparative Example 1

30 molar parts of the diamine in Formula 2 (5.4 g) and 70 molar parts of the diamine in Formula 1 (12.24 g) were dissolved in 105.50 mL of NMP. 50 molar parts of the dianhydride in Formula 3 (14.77 g) and 50 molar parts of the dianhydride in Formula 5 (10.0 g) were then added to the NMP solution. 0.44 g of iso-quinoline to serve as a catalyst was then added to the NMP solution. The NMP solution was first stirred at room temperature for 5 minutes, and then heated to 220° C. and then reacted at 220° C. for 4 hours to obtain a polyimide. The polyimide solution was totally transformed into a gel. The gel was insoluble, even after adding a large amount of solvent to the gel.

Comparative Example 2

60 molar parts of the diamine in Formula 2 (14.05 g) and 40 molar parts of the diamine in Formula 1 (34.42 g) were dissolved in 196.98 mL of NMP. 100 molar parts of the dianhydride in Formula 3 (50 g) was then added to the NMP solution. 1.69 g of iso quinoline to serve as a catalyst was then added to the NMP solution. The NMP solution was first stirred at room temperature for 5 minutes, and then heated to 220° C. and then reacted at 220° C. for 4 hours to obtain a polyimide. The polyimide solution was totally transformed into a gel. The gel was insoluble, even after adding a large amount of solvent to the gel.

Comparative Example 3

60 molar parts of the diamine in Formula 2 (14.05 g) and 40 molar parts of the diamine in Formula 1 (10.09 g) were dissolved in 132.3 mL of NMP. 60 molar parts of the dianhydride in Formula 3 (22.16 g) and 40 molar parts of the dianhydride in Formula 5 (10.0 g) were then added to the NMP solution. 0.57 g of iso-quinoline to serve as a catalyst was then added to the NMP solution. The NMP solution was first stirred at room temperature for 5 minutes, and then heated to 220° C. and then reacted at 220° C. for 4 hours to obtain a polyimide. The polyimide solution was partially transferred to a gel, thereby being difficult to coat on a substrate.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A polyimide, being polymerized by x molar parts of a first diamine, y molar parts of a second diamine, z molar parts of a first dianhydride, and w molar parts of a second dianhydride;

wherein the first diamine has a formula of

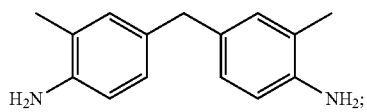

the second diamine has a formula of

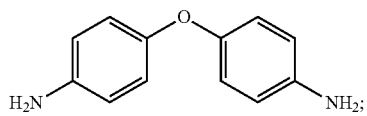 [SMILES: Nc1ccc(Oc2ccc(N)cc2)cc1]

the first dianhydride has a formula of

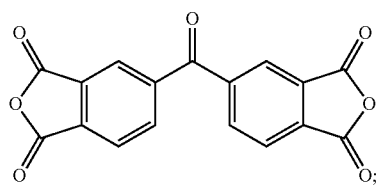 [SMILES: O=C(c1ccc2c(c1)C(=O)OC2=O)c1ccc2c(c1)C(=O)OC2=O]

the second dianhydride has a formula of

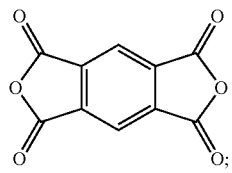 [SMILES: O=c1oc(=O)c2cc3c(=O)oc(=O)c3cc12]

$x+y=z+w=100$;
$50 \leq x \leq 80$;
$20 \leq y \leq 50$;
$60 \leq z < 100$; and
$0 < w \leq 40$.

2. The polyimide as claimed in claim 1, wherein x is 50, y is 50, z is 60 and w is 40.

3. The polyimide as claimed in claim 1, wherein x is 60, y is 40, z is 60 and w is 40.

4. The polyimide as claimed in claim 1, wherein x is 80, y is 20, z is 80 and w is 20.

5. The polyimide as claimed in claim 1, having a relative viscosity of 2000 cps to 30000 cps at 25° C.

6. The polyimide as claimed in claim 1, having a relative viscosity variation of less than or equal to 10% after being stored at 20° C. to 30° C. for 1 day to 180 days.

7. The polyimide as claimed in claim 1, wherein the polyimide is polymerized from a reaction mixture comprising monomer ingredients consisting of x molar parts of the first diamine, y molar parts of the second diamine, z molar parts of the first dianhydride, and w molar parts of the second dianhydride, wherein x+y=z+w=100; $50 \leq x \leq 80$; $20 \leq y \leq 50$; $60 \leq z < 100$; and $0 < w \leq 40$.

8. The polyimide as claimed in claim 7, wherein said reaction mixture further comprises a solvent and a catalyst.

* * * * *